United States Patent [19]

Thomas

[11] 4,175,635
[45] Nov. 27, 1979

[54] ANTI-THEFT DEVICE FOR INTERNAL COMBUSTION ENGINE OF A MOTOR VEHICLE

[76] Inventor: James Thomas, R.D. 5, Box 31A, Dover, Del. 19901

[21] Appl. No.: 922,486

[22] Filed: Jul. 6, 1978

[51] Int. Cl.² .............................................. B60R 25/04
[52] U.S. Cl. ...................................... 180/287; 70/243; 307/10 AT
[58] Field of Search .................. 180/114; 70/243, 242; 137/383; 307/10 AT

[56] References Cited

U.S. PATENT DOCUMENTS

| | | | |
|---|---|---|---|
| 1,040,509 | 8/1912 | Cleveland | 70/243 |
| 1,217,719 | 2/1917 | Dorgan | 70/243 |
| 1,582,528 | 4/1926 | Michael | 70/243 |
| 3,358,481 | 12/1967 | Roszkowski | 307/10 AT |
| 3,630,306 | 12/1971 | Shur | 180/114 |
| 3,682,267 | 8/1972 | Kayser | 180/114 |
| 3,720,284 | 3/1973 | Myers | 180/114 |
| 3,750,430 | 8/1973 | Crisa | 70/243 |
| 3,773,139 | 11/1973 | Landi | 180/114 |
| 3,855,828 | 12/1974 | Verderber | 70/243 |
| 3,968,666 | 7/1976 | MacKinnon | 70/243 |

Primary Examiner—Robert R. Song
Attorney, Agent, or Firm—Stevens, Davis, Miller & Mosher

[57] ABSTRACT

There is disclosed an anti-theft device for an internal combustion engine of a motor vehicle that has two features to prevent theft that come into operation upon activation of a single switch that can be hidden and is part of the overall ignition system in addition to the ignition switch. Activation of the single switch causes a three-way solenoid valve to divert gasoline from the fuel pump back to the fuel tank rather than to the carburetor and also causes a break in the ignition circuit between the ignition coil and the distributor.

1 Claim, 1 Drawing Figure

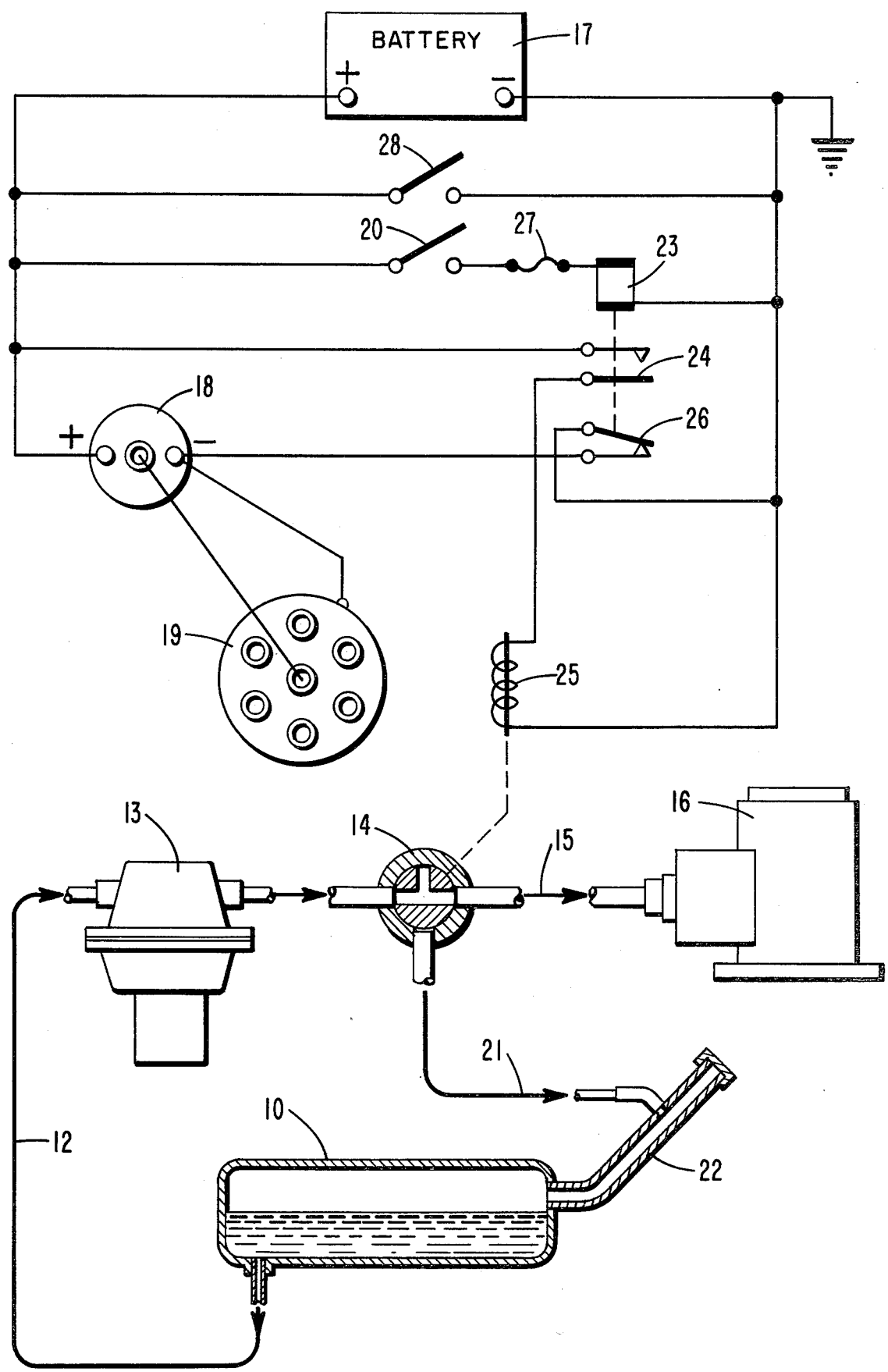

ANTI-THEFT DEVICE FOR INTERNAL COMBUSTION ENGINE OF A MOTOR VEHICLE

The present invention relates to an anti-theft device for an internal combustion engine of a motor vehicle. More particularly, the present invention is directed to an anti-theft device representing a distinct improvement over anti-theft systems and safety locks of the prior art. The anti-theft device of the present invention is characterized by two features which come into operation by activation of a single hidden switch; those features are causing diversion of fuel (ordinarily gasoline) from the fuel pump back to the fuel tank thus cutting off the flow of fuel to the carburetor and causing a break in the circuit between the ignition coil and the distributor. Diversion of fuel is caused by activation of a three-way solenoid valve.

BACKGROUND OF THE INVENTION

Attempts to produce an effective anti-theft device or safety lock for motor vehicles have been undertaken for a long time. Representative patents showing such devices or locks include:

U.S. Pat. No. 1,040,509—Cleveland
U.S. Pat. No. 1,217,719—Dorgan
U.S. Pat. No. 1,582,528—Michael
U.S. Pat. No. 3,358,481—Roszkowski
U.S. Pat. No. 3,630,306—Shur
U.S. Pat. No. 3,682,267—Kayser
U.S. Pat. No. 3,720,284—Myers
U.S. Pat. No. 3,750,430—Crisa
U.S. Pat. No. 3,773,139—Landi
U.S. Pat. No. 3,855,828—Verderber
U.S. Pat. No. 3,879,969—Pynn
U.S. Pat. No. 3,968,666—MacKinnon These patents show a variety of devices or locks which range from very complex to relatively simple structures possessing a multitude of ways of basically preventing someone from by-passing the ignition system and/or effecting gas flow from the gas tank to the carburetor. These patents, however, do not describe an anti-theft device which has features of the present invention.

OBJECTS OF THE INVENTION

It is an object of the present invention to provide an anti-theft device of relatively simple construction for an internal combustion engine of a motor vehicle.

It is another object of the present invention to provide an anti-theft device for an internal combustion engine of a motor vehicle wherein the device contains means to interrupt gas flow from the gas tank to the carburetor and also means to prevent the motor vehicle from being "hot-wired".

It is another object of the invention to provide an anti-theft device for an internal combustion engine of a motor vehicle wherein the device contains a three-way solenoid valve.

It is yet another object of the present invention to provide an anti-theft device for an internal combustion engine of a motor vehicle wherein the device has means for diverting gasoline in the gas line back to the gas tank.

It is another object of the invention to provide an anti-theft device for an internal combustion engine of a motor vehicle made up of a relatively simple arrangement of readily available components.

GENERAL DESCRIPTION OF THE INVENTION

The present invention is directed to an anti-theft device for an internal combustion engine of a motor vehicle that contains among its parts a fuel tank, a fuel pump, a carburetor, an ignition circuit including an ignition coil and a distributor, a three-way solenoid valve having a connection between the fuel pump and the carburetor, and a return fuel line located between the fuel tank and the three-way solenoid valve. The three-way solenoid valve is connected between the fuel pump and the carburetor and is activated by a switch known to the operator and independent of the normal ignition system and the motor vehicle. Upon activation of the three-way solenoid valve, the flow of gasoline is stopped from the fuel pump to the carburetor and at the same time gasoline is diverted back to the gas tank; at the same time activation of the switch also breaks the circuit between the ignition coil and the distributor.

The advantages of the anti-theft device of this construction are apparent. The switch for activation can be located in a position known only to the operator of the motor vehicle and thus the car cannot be "hot-wired" and driven for substantial periods of time because the failure to activate the three-way solenoid valve prevents gasoline from flowing from the gas tank through the fuel pump into the carburetor.

BRIEF DESCRIPTION OF THE DRAWING

The FIGURE shows a schematic diagram of the invention.

SPECIFIC DESCRIPTION OF THE INVENTION

The invention is believed better understood by reference to the FIGURE, wherein a system is shown formed of fuel tank 10 containing gasoline which passes from the tank through line 12 into fuel pump 13. The gasoline then flows from the fuel pump through the open passage in three-way solenoid valve 14 to line 15 and into carburetor 16. The basic portions of the ignition system are shown containing battery 17, ignition coil 18, and distributor 19. Upon activation of the three-way solenoid valve by hidden switch 20, the valve shifts its position counterclockwise so that any flow of gasoline from the fuel pump does not enter the carburetor but passes through line 21 back into pipe 22 for the gas tank 10. The diversion of the gasoline is made in the three-way solenoid valve rather than in the carburetor. Diversion occurs before the gasoline reaches the carburetor. By returning fuel to the gas tank, pressure is relieved in the three-way solenoid valve and fuel is diverted from those areas that could cause a fire hazard due to the build-up of fuel.

When switch 20 is closed, relay 23 is energized causing contact 24 to close. Closing of the contact 24 activates the three-way solenoid valve through solenoid coil 25 and the flow of gasoline is diverted from carburetor 16 back to the gas tank.

The energization of the relay 23 also causes the contact 26 to open and this in turn breaks the circuit from the ignition coil 18 to the distributor 19.

The open circuit between the ignition coil 18 and the distributor 19 makes it impossible to hot-wire a start merely by by-passing the ignition switch. Should the thief in some way be able to start the motor vehicle, the vehicle will be able to run only for a short time because there is no flow of gasoline to the carburetor and the motor vehicle will move only as far as it can using the gasoline already present in the lines, in most instances only a few yards.

In the drawing, switch 28 represents the conventional ignition switch for turning on the engine. If this switch is by-passed by hot-wiring, it is impossible for the motor vehicle to preceed very far because if switch 20 is contacted to activate relay 23 through fuse 27, the circuit between the ignition coil 18 and the distributor 19 is broken and the three-way solenoid valve is arranged so that the flow of gasoline is diverted from the fuel pump 13 back into gasoline tank 10.

The three-way solenoid valve is a readily available piece of equipment which can be secured from the Automatic Switch Co. of Florham Park, New Jersey.

As indicated, the anti-theft system is activated by activation of the switch preferably located in an area out of normal view but known to the operator. Possible locations are under the floor board or in the trunk of the motor vehicle. It is possible to place an indicator light on the dashboard or other appropriate location to let the operator know that the system is either in operation or disconnected.

Having described the present invention in a preferred embodiment, applicant now sets out what he regards as his invention in the appended claim which should be regarded as limiting.

What is claimed is:

1. An anti-theft device for an internal combustion engine of a motor vehicle comprising, in combination,
 a fuel tank,
 a fuel pump,
 a carburetor,
 a three-way solenoid valve,
 an ignition circuit including an ignition coil and a distributor, and
 a return fuel line located between said fuel tank and said three-way solenoid valve, said three-way solenoid valve being connected between said fuel pump and said carburetor and activated by a switch known to the operator and independent of the normal ignition system in said motor vehicle, said three-way solenoid valve upon activation causing stoppage of the flow of gasoline from said fuel pump to said carburetor and at the same time causing diversion of gasoline back to said gas tank, activation of said switch also breaking the circuit between said ignition coil and said distributor.

* * * * *